US011416949B2

(12) United States Patent
Vasthimal et al.

(10) Patent No.: US 11,416,949 B2
(45) Date of Patent: Aug. 16, 2022

(54) METHOD AND SYSTEM FOR PAYMENT DELEGATION USING PERSONALIZED MULTIMEDIA MECHANISM

(71) Applicant: eBay Inc., San Jose, CA (US)

(72) Inventors: Deepak Kumar Vasthimal, Karnataka (IN); Sudeep Kumar, Kerala (IN)

(73) Assignee: EBAY, INC., San Jose, CA (US)

( * ) Notice: Subject to any disclaimer, the term of this patent is extended or adjusted under 35 U.S.C. 154(b) by 467 days.

(21) Appl. No.: 15/422,804

(22) Filed: Feb. 2, 2017

(65) Prior Publication Data

US 2018/0218365 A1    Aug. 2, 2018

(51) Int. Cl.
*G06Q 50/00* (2012.01)
*G06Q 10/10* (2012.01)

(52) U.S. Cl.
CPC ......... *G06Q 50/01* (2013.01); *G06Q 10/1093* (2013.01)

(58) Field of Classification Search
CPC ........................... G06Q 50/01; G06Q 10/1093
USPC ........................................................... 705/44
See application file for complete search history.

(56) References Cited

U.S. PATENT DOCUMENTS

| | | | | |
|---|---|---|---|---|
| 2002/0016766 A1* | 2/2002 | Raja | ..................... | G06Q 20/102 705/40 |
| 2002/0093983 A1* | 7/2002 | Newberg | ................ | H04L 47/14 370/348 |
| 2002/0126698 A1* | 9/2002 | Deshpande | .... | H04N 21/234327 370/467 |
| 2002/0199009 A1* | 12/2002 | Willner | ................... | H04L 29/06 709/233 |
| 2003/0065749 A1* | 4/2003 | Gailey | .................. | H04L 67/306 709/224 |
| 2007/0167167 A1* | 7/2007 | Jiang | ................... | H04M 7/1235 455/432.1 |
| 2007/0211651 A1* | 9/2007 | Ahmed | ................. | H04L 67/104 370/256 |
| 2010/0017047 A1* | 1/2010 | Sanders-Reed | .......... | G06F 3/14 701/3 |

(Continued)

*Primary Examiner* — Lindsay M Maguire
*Assistant Examiner* — Michael J Warden
(74) *Attorney, Agent, or Firm* — Schwegman Lundberg & Woessner, P.A.

(57) ABSTRACT

A system, method, and computer program product for providing personalized coordinated shopping among multiple participants in a network marketplace. Social group interactions are extended to shopping, to enhance the scope and efficiency of commerce. A shopping group comprising selected members of a social group includes an authorized purchaser and a number of shoppers who are not authorized to make purchases. A non-authorized purchaser selects desired items and sends a purchase approval request to the authorized purchaser, including a personalized video message describing and supporting the request. The personalized video message is sent to the authorized purchaser by communication means selected according to determined current availability, including via review of a social calendar. The authorized purchaser may approve, decline, or request further information from the requester, upon reviewing the purchase request. The authorized purchaser may modify the requested transaction, including the item actually purchased, the seller, and its shipping data.

20 Claims, 8 Drawing Sheets

(56) References Cited

U.S. PATENT DOCUMENTS

| | | | | |
|---|---|---|---|---|
| 2010/0114733 A1* | 5/2010 | Collas | ................ | G06Q 30/0601 |
| | | | | 705/26.1 |
| 2014/0040129 A1* | 2/2014 | Akin | ................... | G06Q 20/384 |
| | | | | 705/44 |
| 2015/0073959 A1* | 3/2015 | Connors | ................ | G06Q 40/00 |
| | | | | 705/35 |
| 2016/0171503 A1* | 6/2016 | Nelsen | ................... | G06Q 20/42 |
| | | | | 705/40 |

* cited by examiner

METHOD AND SYSTEM FOR PAYMENT DELEGATION USING PERSONALIZED MULTIMEDIA MECHANISM

TECHNICAL FIELD

The present disclosure relates to messaging between various users of a network-based publication system and marketplace.

BACKGROUND

As the use of network-based publication systems and marketplaces such as online commerce services or auction services expands, and the volume of item listings in such applications increases, the speed, ease, and convenience with which product information that is relevant to customers may be retrieved from such marketplaces increases in importance to customers.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present embodiments may be practiced without these specific details. Examples merely typify possible variations. Unless explicitly stated otherwise, components and functions are optional and may vary in sequence or be combined or subdivided.

Users of networked publication and ecommerce systems often experience difficulty in finding items of interest. Further, some users may find items of interest but may not be authorized to buy them for various reasons. The present inventors have realized, among other things, that the social groupings of users who are authorized to buy items and users who are not authorized to buy items can be used to facilitate creation and use of shopping groupings of users in such networked systems.

The system, method, and computer program product disclosed herein thus may provide improved personalized shopping coordination for shoppers who are not authorized to make purchases on networked publishing and ecommerce sites. Accordingly, one or more of the methodologies discussed herein may obviate a need for calling a separate application by these users and those who are actually authorized to make purchases, which may have the technical effect of reducing computing resources used by one or more devices within the system. Examples of such computing resources include, without limitation, processor cycles, network traffic, memory usage, storage space, and power consumption.

In one example, a method for personalized shopping coordination may include defining a shopping group comprising at least two users of a network marketplace system who are members of a social group, wherein a first user is authorized to make payments and a second user is not authorized to make payments; selecting, by the second user, an item to purchase; sending, by the second user, a personalized video message to the first user requesting payment authorization for the item; and providing, by the first user, a payment authorization decision for the item.

In a further example, a computer-readable hardware medium may store program instructions that, when executed by one or more processors, may perform operations for personalized shopping coordination. The operations may include defining a shopping group comprising at least two users of a network marketplace system who are members of a social group, wherein a first user is authorized to make payments and a second user is not authorized to make payments; selecting, by the second user, an item to purchase; sending, by the second user, a personalized video message to the first user requesting payment authorization for the item; and providing, by the first user, a payment authorization decision for the item.

In another example, a system for personalized shopping coordination may include means for defining a shopping group comprising at least two users of a network marketplace system who are members of a social group, wherein a first user is authorized to make payments and a second user is not authorized to make payments; means for selecting, by the second user, an item to purchase; means for sending, by the second user, a personalized video message to the first user requesting payment authorization for the item; and means for providing, by the first user, a payment authorization decision for the item.

Architecture

Figure 1:
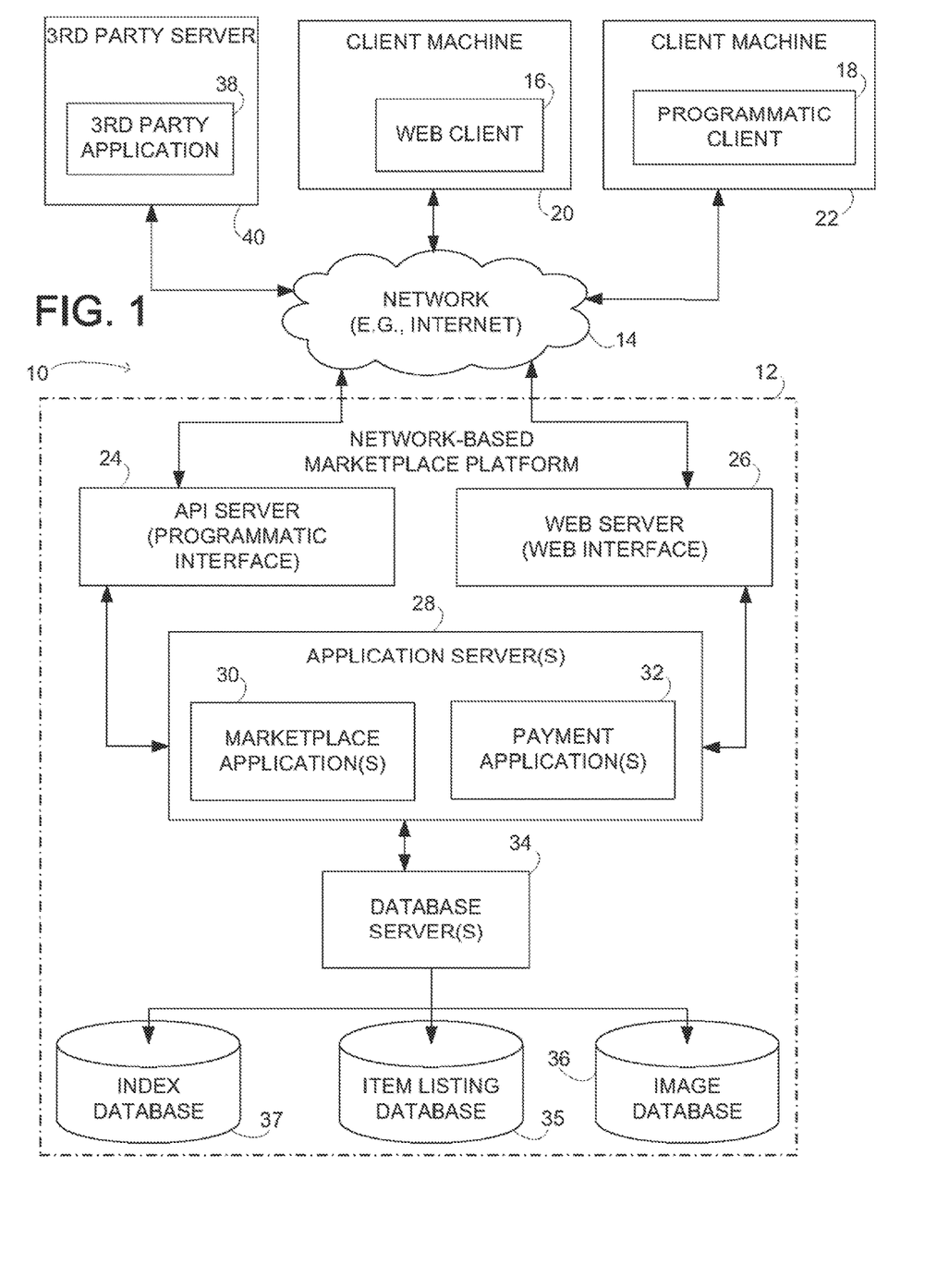
FIG. 1 is a block diagram illustrating a publication system in the example form of a network-based marketplace system.

One example of a distributed network implementing a publication system is illustrated in the network diagram of FIG. 1, which depicts a system 10 using a client-server type architecture. A commerce platform, in the example form of a network-based marketplace platform 12, provides server-side functionality, via a network 14 (e.g., the Internet) to one or more clients. As illustrated, the platform 12 interacts with a web client 16 executing on a client machine 20 and a programmatic client 18 executing on a client machine 22. In one embodiment, web client 16 is a web browser, but it may employ other types of web services.

Turning specifically to the exemplary network-based marketplace platform 12, an Application Program Interface (API) server 24 and a web server 26 are coupled to, and provide programmatic and web interfaces respectively to, one or more application servers 28. The application servers 28 may host one or more marketplace applications 30 and payment applications 32. The application servers 28 are, in turn, shown to be coupled to one or more databases servers 34 that may facilitate access to a number of databases, including an item listing database 35, an image database 36, and an index database 37. The item listing database 35 may store data indicative of item listings for items which are offered for sale or auction on the platform 12.

Each item listing may include, inter alia, a text description of the relevant item and metadata categorizing the item. The image database 36 may include images associated with respective item listings in the item listing database 35. The images in the image database 36 may be standard format image files such as Joint Photographic Expert Group (JPEG) files. The index database 37 may contain index data relating to images in the image database to permit image-based searching of the image database 36.

The marketplace applications 30 may provide a number of marketplace functions and services to users that access the marketplace platform 12. The payment applications 32 likewise may provide a number of payment services and functions to users. The payment applications 32 may allow users to quantify, and accumulate, value (e.g., in a commercial currency, such as the U.S. dollar, or a proprietary currency, such as "points") in accounts, and then to later redeem the accumulated value for products (e.g., goods or services) that are made available via the marketplace applications 30. While the marketplace and payment applications 30 and 32 are shown in FIG. 1 to both form part of the network-based marketplace platform 12, it will be appreciated that, in alternative embodiments, the payment applications 32 may form part of a payment service that is separate and distinct from the marketplace platform 12.

Further, while the system 10 shown in FIG. 1 employs a client-server architecture, the present disclosure is, of course, not limited to such an architecture, and could equally well find application in a distributed, or peer-to-peer, architecture system. The various marketplace and payment applications 30 and 32 could also be implemented as standalone software programs, which do not necessarily have networking capabilities. Additionally, while example embodiments are described with respect to the marketplace platform 12, alternative embodiments may be contemplate use on a publication platform or other non-commerce platforms.

The web client 16, it will be appreciated, may access the various marketplace and payment applications 30 and 32 via the web interface supported by the web server 26. Similarly, the programmatic client 18 may access the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace platform 12 in an off-line manner, and to perform batch-mode communications between the programmatic client 18 and the network-based marketplace platform 12.

FIG. 1 also illustrates a third party application 38, executing on a third party server machine 40, as having programmatic access to the network-based marketplace via the programmatic interface provided by the API server 24. For example, the third party application 38 may, utilizing information retrieved from the network-based marketplace platform 12, support one or more features or functions on a website hosted by the third party. The third party website may, for example, provide one or more promotional, marketplace or payment functions that are supported by the relevant applications of the network-based marketplace platform 12.

Figure 2:
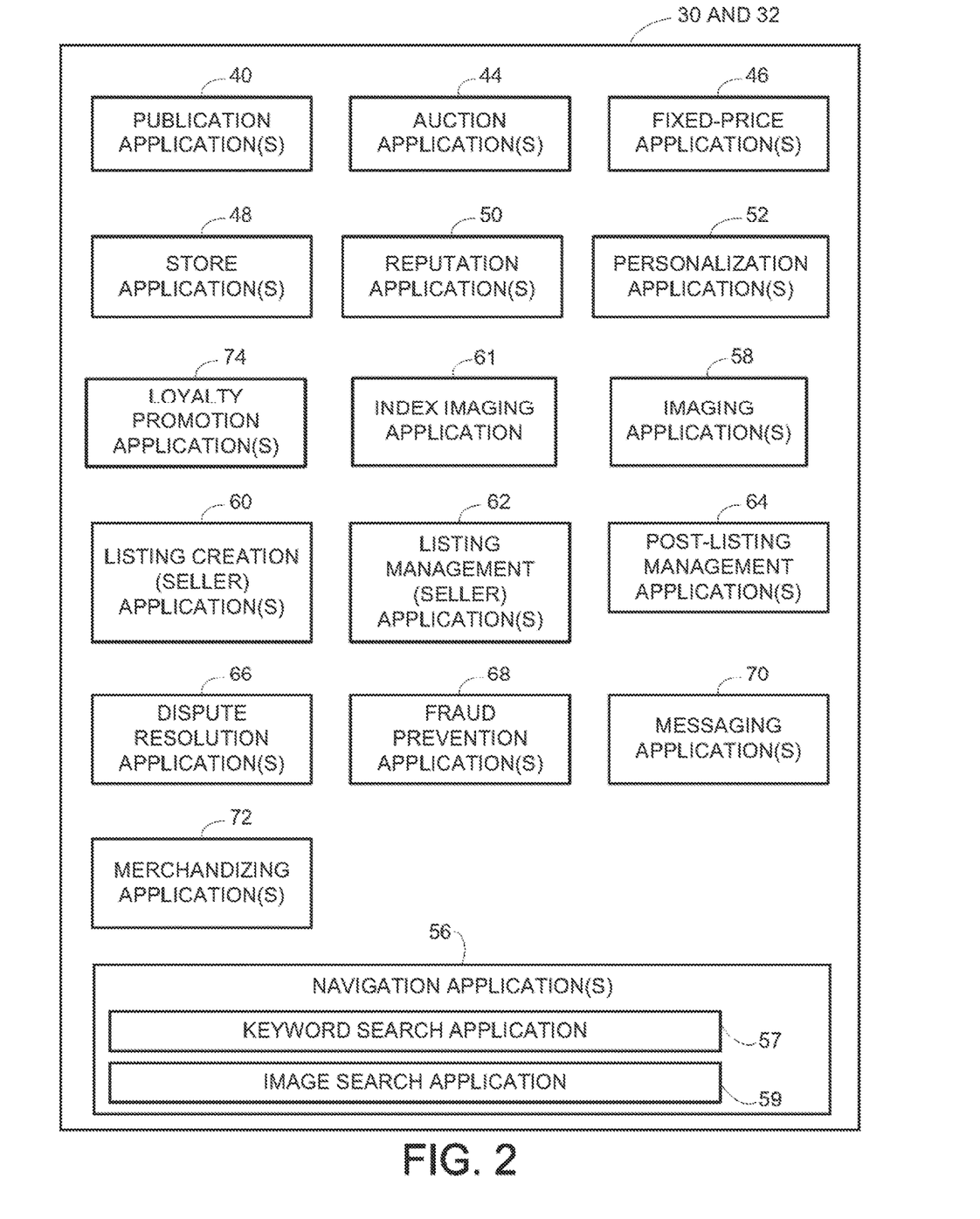
FIG. 2 is a diagrammatic representation of marketplace and payment applications.

FIG. 2 is a block diagram illustrating multiple marketplace and payment applications 30 and 32 that may be provided as part of the network-based marketplace platform 12. The marketplace platform 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include at least one publication application 40 and one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy bidding feature whereby a bidder may invoke automated proxy bidding.

A number of fixed-price applications 46 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives, and features that are specific and personalized to a relevant seller.

Reputation applications 50 allow parties that transact utilizing the network-based marketplace platform 12 to establish, build, and maintain reputations, which may be made available and published to potential trading partners. Consider that where, for example, the network-based marketplace platform 12 supports person-to-person trading, users may have no history or other reference information whereby the trustworthiness and credibility of potential trading partners may be assessed. The reputation application 50 allows a user (for example, through feedback provided by other transaction partners) to establish a reputation within the network-based marketplace platform 12 over time. Other potential trading partners may then reference such a reputation for the purposes of assessing credibility and trustworthiness.

Personalization applications 52 allow users of the marketplace platform 12 to personalize various aspects of their interactions with the marketplace platform 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace and other parties.

In one embodiment, the network-based marketplace platform 12 may support a number of marketplaces that are customized, for example, for specific geographic regions. A version of the marketplace may be customized for the United Kingdom, whereas another version of the marketplace may be customized for the United States. Each of these versions may operate as an independent marketplace, or may be customized (or internationalized) presentations of a common underlying marketplace.

Navigation of the network based-marketplace may be facilitated by one or more navigation applications 56. For example, a keyword search application 57 enables keyword searches of listings published via the marketplace platform 12. Similarly, an image search application 59 enables an image-based search of item listings published via the marketplace platform 12. To perform an image-based search, a user may submit a query image, whereupon the image search application 59 may compare the query image to images in the image database to produce a result list of item listings based on a similarity ranking between the query image and the images associated with the respective item listings. The similarity ranking may be established by parsing or processing the query image to provide index data, and thereafter comparing the query image's index data to pre-compiled index data for the listing images. A browsing application may allow users to browse various category, catalogue, or inventory data structures according to which listings may be classified within the marketplace platform 12. Various other navigation applications may be provided to supplement the search and browsing applications.

In order to make listings available via the network-based marketplace as visually informative and attractive as possible, as well as to enable image-based searching, the marketplace applications 30 may include one or more imaging applications 58, which users may use to upload images for inclusion within listings. Images thus uploaded are stored in the image database 36, with each image being associatively linked to at least one item listing in the item listing database 35. One of the imaging applications 58 may also operate to incorporate images within viewed listings. The imaging applications 58 may also support one or more promotional features, such as image galleries that are presented to potential buyers. For example, sellers may pay an additional fee to have an image included within a gallery of images for promoted items.

The marketplace platform 12 may also include an image indexing application 61 to parse or process images uploaded via the imaging application 58, as well as to parse or process query images submitted via the image search application 59. Index data is the result of processing images by the image indexing application 61 and is stored in the index database 37.

Listing creation applications 60 may allow sellers to conveniently author listings pertaining to goods or services that they wish to transact via the marketplace platform 12, and listing management applications 62 may allow sellers to manage such listings. Specifically, where a particular seller has authored and/or published a large number of listings, the management of such listings may present a challenge. The listing management applications 62 may provide a number of features (e.g., auto-relisting, inventory level monitors, etc.) to assist the seller in managing such listings. One or more post-listing management applications 64 may also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 may provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace. One of the fraud prevention applications 68 may include automatic image comparison, by use of index data produced by the image indexing application 61 and stored in the index database 37. Such image comparison may be used by the fraud prevention application 68 automatically to detect listing images similar to the query image, and to alert a fraud assessor to such image listings, so that the human assessor can examine the identified item listing to determine whether the identified item listing is a fraudulent listing.

Messaging applications 70 may enable the generation and delivery of messages to users of the network-based marketplace platform 12. Such messages may, for example, advise users regarding the status of listings at the marketplace (e.g., providing "outbid" notices to bidders during an auction process or providing promotional and merchandising information to users).

Merchandizing applications 72 may support various merchandizing functions that are made available to sellers to enable sellers to increase sales via the marketplace platform 12. The merchandizing applications 72 also operate the various merchandizing features that may be invoked by sellers and may monitor and track the success of merchandizing strategies employed by sellers.

The present inventors have realized that the marketplace platform 12 described above may be improved if users are provided with additional new functionality. For example, if a user social group could be used to create a user shopping group enabling coordinated communication between users who are authorized to make purchases and those who are not, the improved operations of the networked publication and marketing systems of FIGS. 1-2 may prove advantageous to both buyers and sellers. That is, users who are not authorized to make purchases may nonetheless send purchase requests to an authorized purchaser within the network marketplace, increasing the effective number of buyers significantly.

Figure 3:
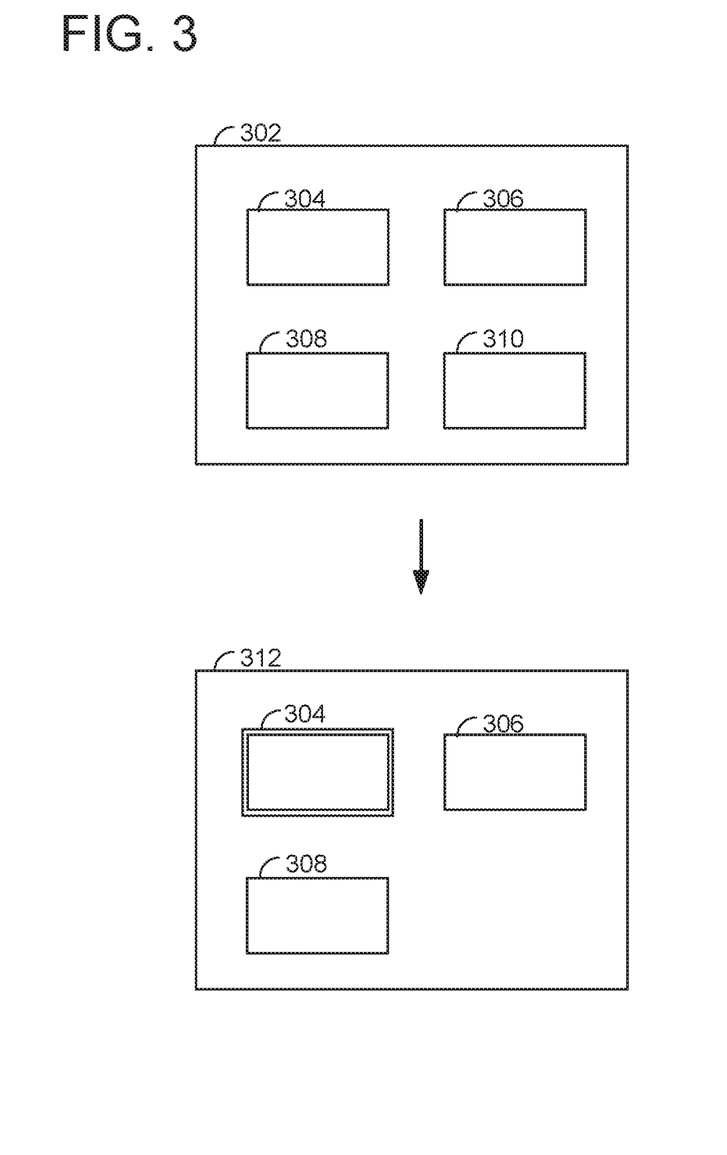
FIG. 3 is a diagrammatic representation of the conversion of a social group into a shopping group, in accordance with a disclosed embodiment.

FIG. 3 is a diagrammatic representation of the conversion of a social group 302 into a shopping group 312, in accordance with a disclosed embodiment. Social group 302 may comprise members 304, 306, 308, and 310 who have established relationships among each other, and can choose to share selected information with each other. The social group members may be family members, friends, colleagues, and/or co-workers for example. Many different social networking applications exist and are familiar to those of ordinary skill in the art (e.g., Facebook®, Twitter®, LinkedIn®, etc.). The social network may also comprise a social networking portion of a networked marketing, publication, and commerce site.

Each user may choose to make his or her current online status available to other members of the social group. For example, if member 304 is currently online and available to receive and send messages, that situation may be communicated to members 306, 308, and 310 in substantially real time. The current online status of any given member may not only help other members decide how to best communicate in a social context, but also in a coordinated shopping context.

Shopping group 312 may be formed by one of the members of the social group 312, such as member 304. Member 304 may be authorized to make purchases at a shopping site, as denoted by the double-outline marking. Member 304 may be referred to as an authorized purchaser, and may choose to add other members to the shopping group 312. In this example, members 306 and 308 from the social group 302 have been added to the shopping group 312, while member 310 has not. In one embodiment, each shopping group 312 may have only one authorized purchaser member, though the present invention is not limited in that respect.

In one example, a parent may authorize purchases for children, or one spouse may authorize purchases for the other. In another example, an adult child may authorize purchases for a parent. In another example, a manager may authorize purchases for a group of workers. In general, the authorized purchaser may approve purchases and perform purchase transactions for a group of non-authorized shopping group members in a coordinated and seamless manner. The authorized purchaser may also disapprove purchase requests, and/or participate in coordinated messaging with other shopping group members to discuss the requests.

Figure 4:
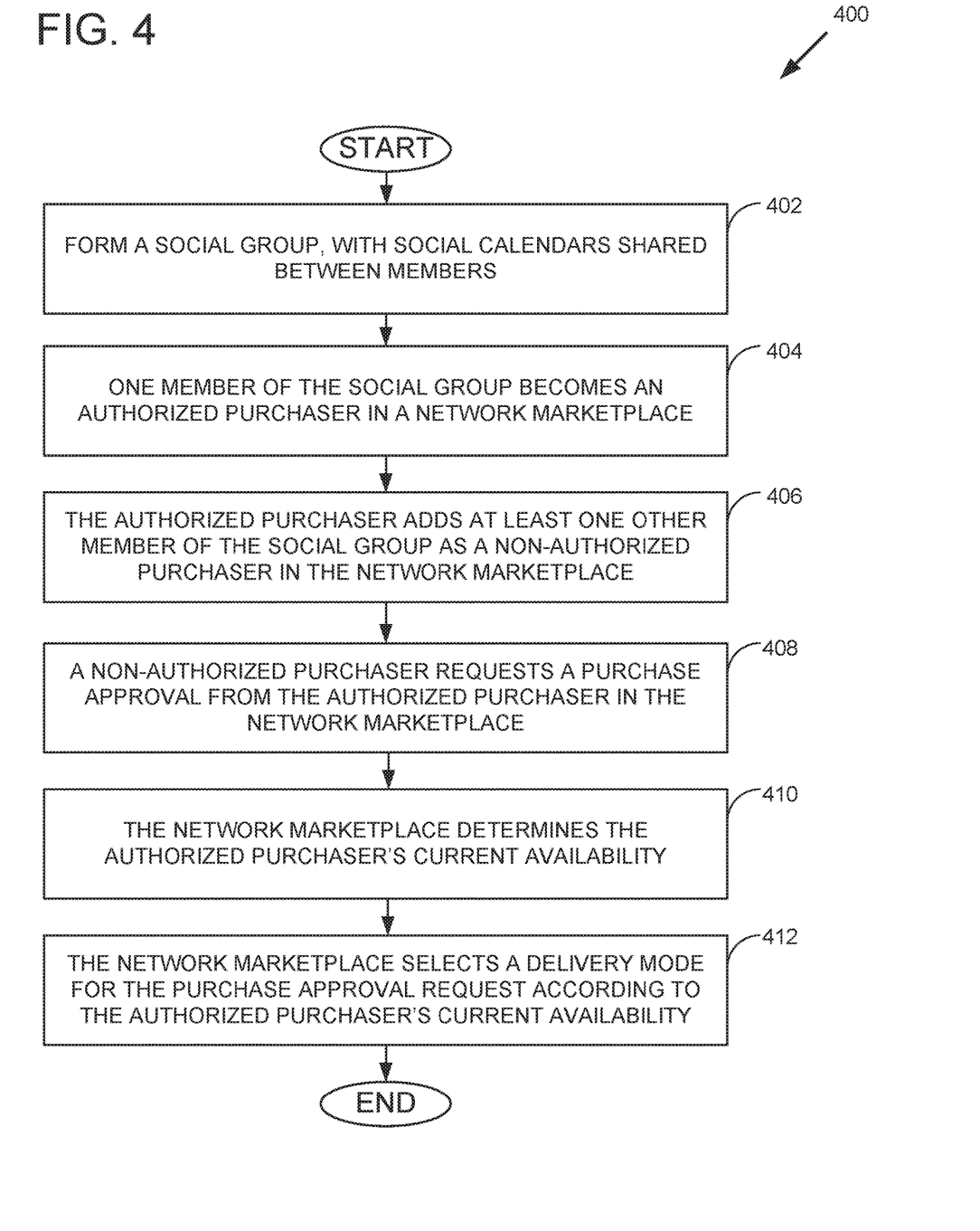
FIG. 4 is a flowchart illustrating a method for forming a shopping group, in accordance with a disclosed embodiment.

FIG. 4 is a flowchart illustrating a method 400 for forming a shopping group, in accordance with a disclosed embodiment. At 402, as previously described, a social group like 302 is formed. Members of the social group 302 may share their current and/or future online status with each other. In one example, members may share their social calendars with each other, to determine present and future times at which a particular member will be online and able to participate in live messaging.

At 404, one member of the social group 302, such as member 304, may become an authorized purchaser in a network marketplace. The authorized purchaser may for example provide payment information to the marketplace, and the marketplace may send a confirmation message requiring a response from the authorized purchaser to establish an account with purchasing capabilities in the network marketplace. Other persons may shop in the network marketplace, but may not be authorized purchasers.

At 406, the authorized purchaser may add at least one other member of the social group 302 as a non-authorized purchaser in the network marketplace and in the shopping group 312. Each member of the shopping group 312 may in one example shop in the network marketplace, communicate within the network marketplace to other shopping group 312 members, and place desired items into an online shopping cart. However, non-authorized purchasers may not perform purchases by themselves.

As with the social group 302, members of the shopping group 312 may comprise family members, friends, colleagues, and co-workers for example. One family member may be an authorized purchaser for a family for example, such as a parent or guardian, while other family members may be non-authorized purchasers, such as children or a spouse. Similarly, the authorized purchaser may be a manager, contractor, or department head who coordinates purchases for a number of non-authorized purchaser workers, subcontractors, or employees for example.

At 408, one of the non-authorized purchasers may request approval from the authorized purchaser to buy an item in the network marketplace. Rather than contacting the authorized purchaser through other means, in one example the requester may contact the authorized purchaser through the network marketplace. In this manner, the need to start and run a separate application is avoided.

The approval request may take a number of forms, from a simple text message, an audio message, or a video message for example. Whatever the form, the approval request may be personalized by the requester, who typically knows the authorized purchaser. The requester may thus tailor the approval request to most effectively coordinate with the authorized purchaser. For example, a child may explain to a parent why a given item is desirable in terms that are most likely to persuade the parent to approve the purchase.

Although in this description only one personalized purchase request is described, the present invention is not so limited; many personalized messages may be exchanged between the requester and the authorized purchaser. The messages may all be exchanged within the network marketplace application, so that use of a separate application is not required. The network marketplace application may also call separate applications to facilitate the message exchanges, but the network marketplace users need not be aware of this operational feature.

At 410, the network marketplace may determine the current availability of the authorized purchaser. If the authorized purchaser is online and thus able to process messages "live", the communication of the purchase request to the authorized purchaser may be handled differently than if the authorized purchaser is not currently online. The current availability of a member of the shopping group 312 may be determined within the network marketplace by checking if the member is currently logged into the network marketplace for example. In another example, the current availability of a member of the shopping group 312 may be determined from the shared social calendar of that member.

At 412, the network marketplace may select a delivery mode for the purchase approval request according to the authorized purchaser's current availability. The delivery mode may be tailored to best take advantage of the availability status, so that a purchase approval decision may be made as efficiently as possible. Efficiency of such coordinated shopping activities benefits both buyers and sellers. Buyers may have their purchases approved quickly without needing to become authorized purchasers themselves. Sellers may experience sales increases because buyers other than authorized purchasers are now able to be involved in the shopping process, via coordinating with the authorized purchaser.

There may be many situations in which non-authorized purchasers would benefit from participating in such a shopping group on the network marketplace. For example, children may not have the financial responsibility or legal capacity to have access to the payment methods required become authorized purchasers, but they nonetheless may enjoy shopping. Children usually depend on their parents to perform a payment transaction, either from their own accounts or from the parent's (or parents') account on the network marketplace. Similarly, in corporate, government, or university situations for example, formal budget control practices may require review of purchase requests before approval can be granted by an assigned authorized purchaser.

Further, in some cases the non-authorized purchaser may reside in a region where purchases are difficult, or where access to payment methods is limited or not available. For example, some items may be restricted due to cultural considerations, so a non-authorized purchaser may need assistance from an authorized purchaser, who may reside elsewhere or otherwise be free from the restrictions. Also, in auction situations, the auction may end at an inconvenient time for the non-authorized purchaser, so an authorized purchaser in another time zone may help resolve that issue by bidding for the non-authorized purchaser.

In another embodiment, the network marketplace may consider the predetermined bandwidth limitations faced by the authorized purchaser and responsively modify the communication means for messaging to the authorized purchaser. For example, a voice-only call or personalized text message may be sent rather than a video call or the entire personalized video message. Likewise, an SMS (Short Message Service) text message with a link to an item description may be sent to the authorized purchaser instead of a full web page. Similarly, an item photo in an item description may be modified to have a lower resolution, or may be displayed only after the authorized purchaser clicks on it.

Figure 5:
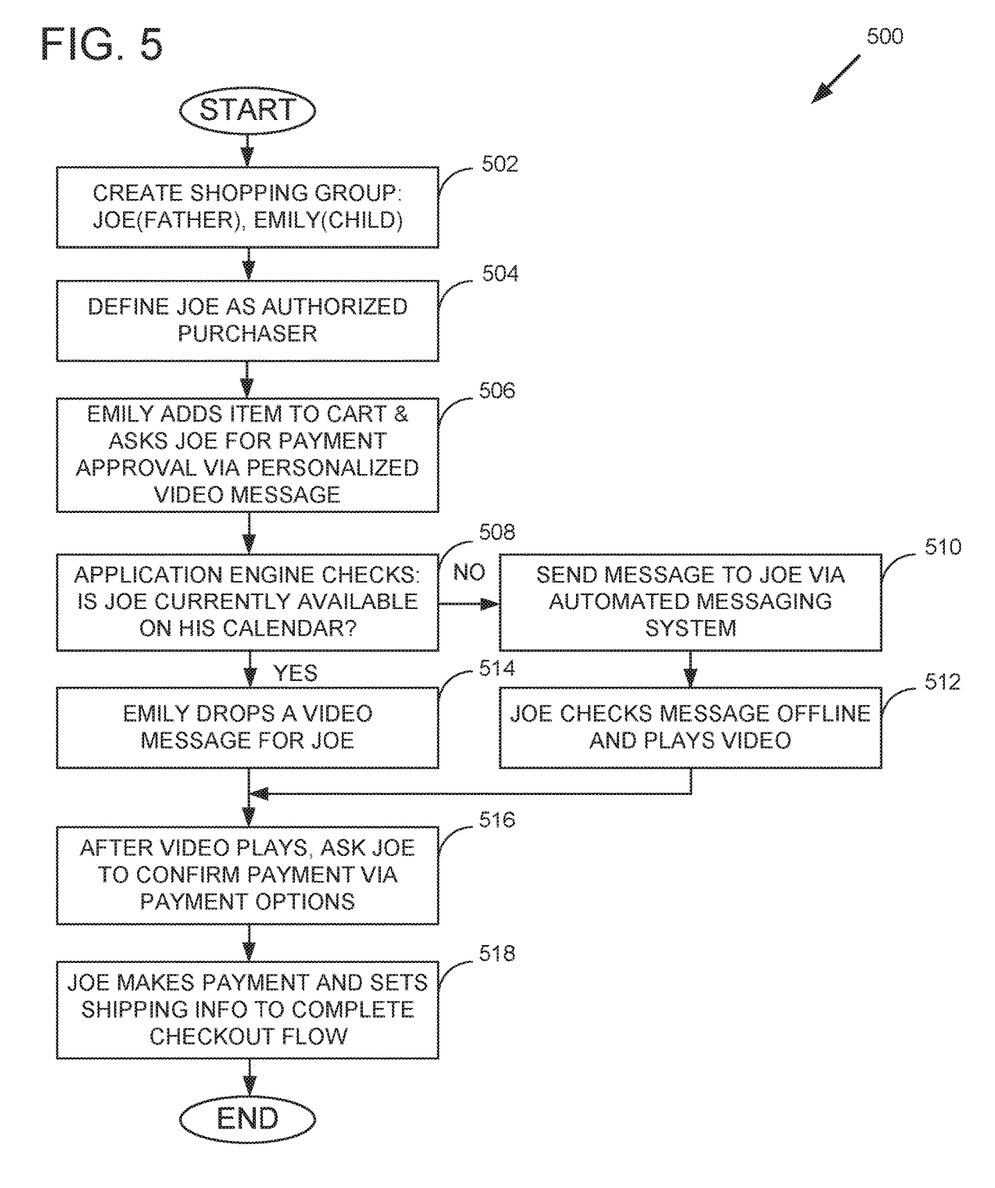
FIG. 5 is a flow chart illustrating a method for processing a shopping group purchase, in accordance with a disclosed embodiment.

FIG. 5 is a flow chart illustrating a method 500 for processing a shopping group purchase, in accordance with a disclosed embodiment. At 502, a shopping group may be created as previously described, comprising for example Joe and Emily, where Joe is Emily's father. At 504, Joe may be defined as the authorized purchaser for the shopping group, as Joe has access to requisite payment methods. At 506, Emily may add an item to an online shopping cart in a network marketplace, and ask Joe for payment approval via the network marketplace. Emily may click a "Group Buy" button for example in the network marketplace application user interface to send the purchase request.

The request for purchase approval may be sent entirely within a network marketplace environment, without the need to run additional applications. Further, Emily may create a personalized video message related to the purchase approval request. For example, Emily may provide a description of why she needs or wants the item, in entirely personalized terms that she deems most likely to be persuasive. The network marketplace may also provide item information, such as a corresponding item number, its price, quantity available, seller identifier, etc., via a link to an item listing or an appended copy of the item listing.

At 508, the network marketplace application engine may determine if Joe is currently available. For example, the network marketplace may determine if Joe is currently logged into the network marketplace or a related messaging application the network marketplace uses. The network marketplace may also check Joe's social calendar to determine from the calendar if Joe is currently available.

At 510, if Joe is not currently available, the network marketplace may send the personalized video message to Joe via an automated messaging system. In another example, network marketplace system may store the personalized video message on the network marketplace and may send a note to Joe informing him of the availability of the personalized video message on the network marketplace. The note may be sent immediately in one embodiment, or at a future time when Joe's social calendar indicates he will be available in another example. At 512, Joe may check the note offline and play the personalized video message.

At 514, if Joe is currently available, in one embodiment the network marketplace may "drop" the personalized video message into Joe's network marketplace account so it is immediately available for viewing by Joe. Note that no separate application is required to be started by Joe for Joe to view the personalized video message. Further, if the purchase request relates to an auction item, Joe can bid on the item in the network marketplace immediately after viewing the personalized video message from Emily if he so chooses.

In another embodiment, the network marketplace may notify Joe of the personalized video message by automatically placing a video call to Joe and playing the personalized video message "live". An automated voice system may then ask for Joe's approval in audio form for example. Joe may want additional information from the requestor and so may send the requester a message or may initiate a live phone call to the requester to discuss the request. Thus, a back and forth exchange of messages to coordinate a purchase request within the shopping group may be provided within the network marketplace.

At 516, after the personalized video message from Emily has been played, the network marketplace may ask Joe to confirm payment of an approved purchase via available payment options. For example, Joe may have a credit card or other payment mechanism already established in the network marketplace. The payment method may have been established when Joe became an authorized purchaser for the shopping group, for example. Joe may provide purchase approval in a variety of ways, including clicking a "Purchase Approved" button in the network marketplace, sending a text message, or by providing an audio utterance indicating his approval verbally.

At 518, Joe may make a payment and may also set shipping information to complete the item checkout flow. Note that Joe may not follow the shipping information (destination address, shipping company, etc.) that Emily may have suggested in the purchase request. Joe may instead choose a different destination address, shipping speed and shipping cost, etc. That is, since Joe is providing purchase approval and payment, he may control the details of the transaction.

Figure 6:
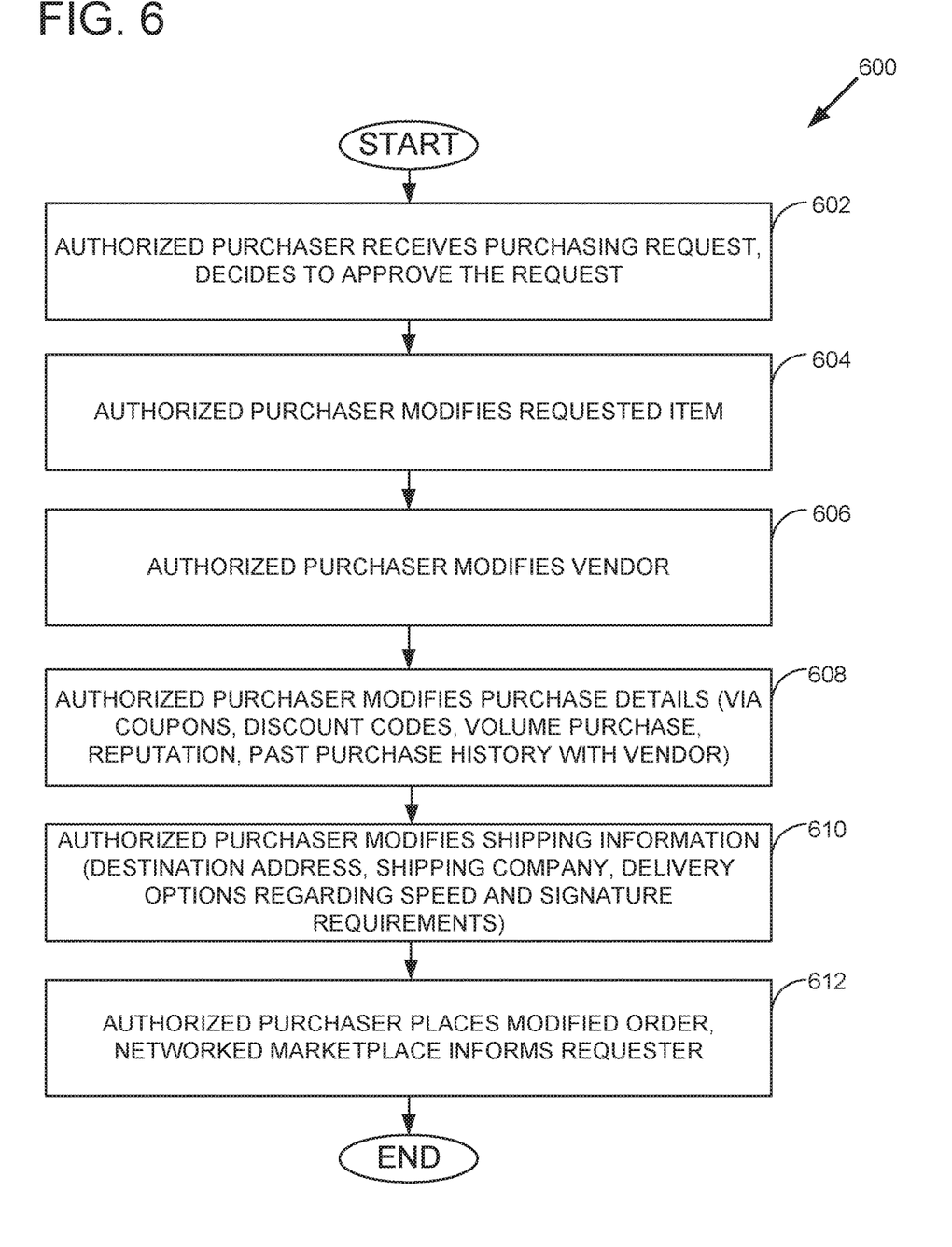
FIG. 6 is a flow chart illustrating a method for managing a shopping group purchase by an authorized purchaser, according to an embodiment.

FIG. 6 is a flow chart illustrating a method 600 for managing a shopping group purchase by an authorized purchaser, according to an embodiment. At 602, the authorized purchaser may receive the purchasing request as described above. The authorized purchaser may decide to approve the request, based on the personalized video message and the relationship with the requester. At 604, the authorized purchaser may modify the requested item. That is, the authorized purchaser may choose not to purchase the originally requested item because an alternate item is preferred. The authorized purchaser may for example have found a similar or better item, perhaps at a better price.

At 606, the authorized purchaser may modify the vendor of the requested item. The authorized purchaser for example may decide to buy the item from a vendor who offers a better price, or discounts or other benefits under an arrangement that already exists with the authorized purchaser. The authorized purchaser may also decide to buy the item from a vendor who is in a different location than the original vendor who may have been associated with the requested item.

At 608, the authorized purchaser may modify other purchase details. For example, the authorized purchaser may have coupons or discount codes to apply, or may aggregate the requested purchase with other purchase requests to make a volume purchase. Similarly, the authorized purchaser may select a vendor because of a past purchase history with the authorized purchaser, or because of a reputation rating.

At 610, the authorized purchaser may modify the shipping information related to the approved purchase. For example, the destination address and/or shipping company may not be those originally requested, as noted above. Further, the authorized purchaser may choose a delivery speed and cost, insurance coverage, and may also specify whether a recipient signature is required.

At 612, the authorized purchaser may place the modified order. The network marketplace may inform the shopping group member who requested the purchase of the purchase and related information. For example, the item listing of the purchased item may be provided to the requester via the network marketplace.

Modules, Components and Logic

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of some of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations thereof. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Three-Tier Software Architecture

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various APIs), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the Open Systems Interconnection (OSI) model or Transfer Control Protocol/Internet Protocol (TCP/IP) protocol stack model for defining the protocols used by a network to transmit data. In applying these models, a system of data transmission between a server and client, or between peer computer systems, may, for example, include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally Asynchronous Transfer Mode (ATM), Systems Network Architecture (SNA), Serial Digital Interface (SDI), or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the embodiment. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Figure 7:
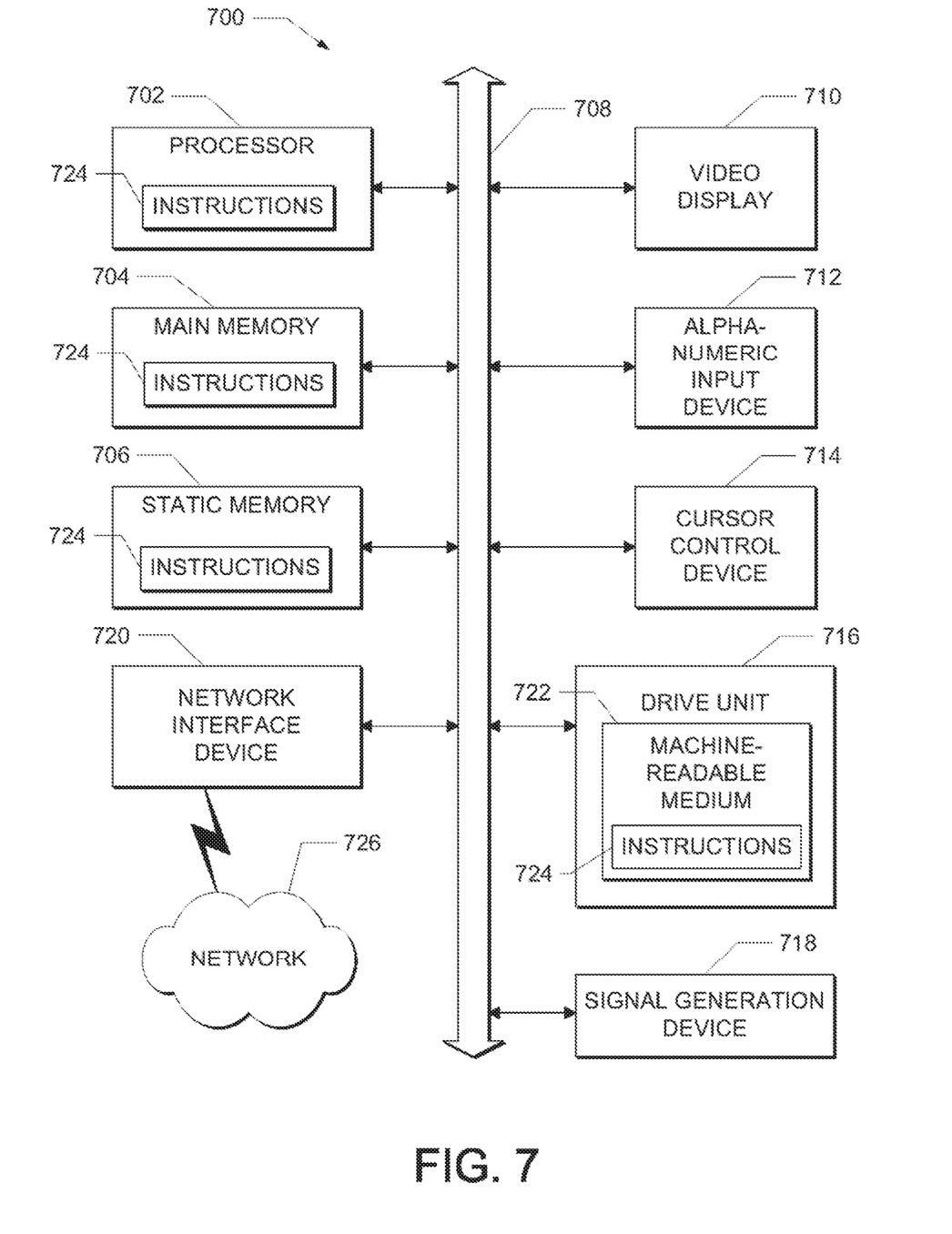
FIG. 7 is a block diagram of a machine in the example form of a computer system within which a set of instructions for causing the machine to perform any one or more of the methodologies discussed herein, may be executed.

FIG. 7 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., CPU, a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker), and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the static memory 706, the main memory 704, and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, and optical and magnetic media.

Data Structures

Figure 8:
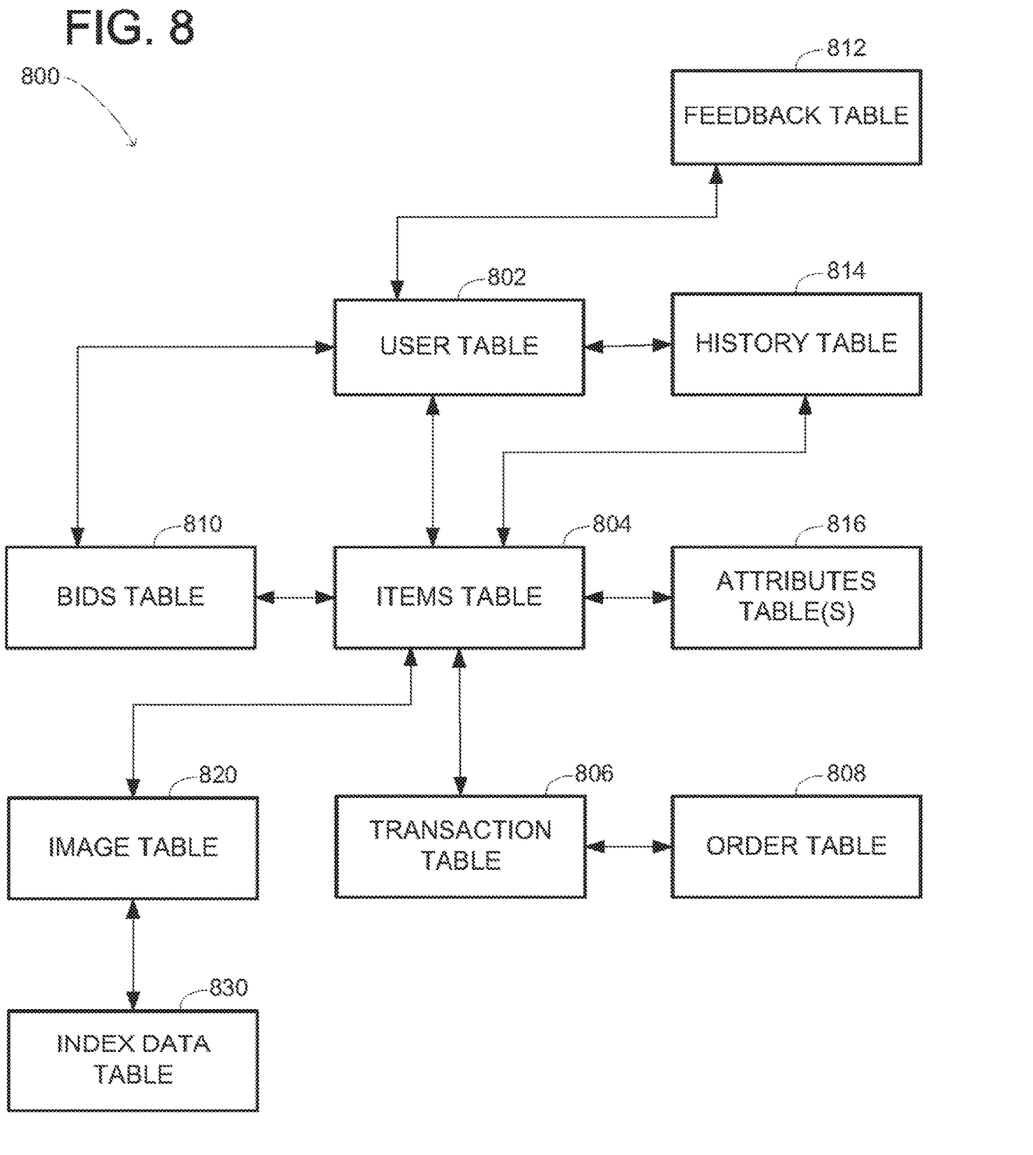
FIG. 8 is a diagrammatic view of a data structure according, to an example embodiment of a network-based marketplace.

FIG. 8 is a high-level entity-relationship diagram of an example embodiment, illustrating various tables 800 that may be maintained within the databases 35 to 37, and that are utilized by and support the applications 30 and 32. A user table 802 contains a record for each registered user of the network-based marketplace platform 12, and may include identifier, address, and financial instrument information pertaining to each such registered user. A user may operate as a seller, a buyer, or both, within the network-based marketplace platform 12. In one example embodiment, a buyer may be a user that has accumulated value (e.g., commercial or proprietary currency), and is accordingly able to exchange the accumulated value for items that are offered for sale by the network-based marketplace platform 12. The user table 802 may also contain sensor data for a user.

The tables 800 also include an items table 804 in which are maintained item records for goods and services that are available to be, or have been, transacted via the network-based marketplace platform 12. Each item record within the items table 804 may furthermore be linked to one or more user records within the user table 802, so as to associate a seller and one or more actual or potential buyers with each item record.

The items table 804 may be connected to an image table 820, which contains images associated with the respective items or item listings in the items table 804. The image table 820 is in turn connected to an index data table 830, which contains index data as described in detail above.

A transaction table 806 contains a record for each transaction (e.g., a purchase or sale transaction) pertaining to items for which records exist within the items table 804. The transaction table 806 may also contain recommendations that have been provided to the user based on physical activity determined from sensor data and on products purchased by other similar users.

An order table 808 is populated with order records, with each order record being associated with an order. Each order, in turn, may correspond to one or more transactions for which records exist within the transaction table 806. The order table 808 may also contain indications of whether an order was based on a recommendation provided based on sensor data.

Bid records within a bids table 810 each relate to a bid received at the network-based marketplace platform 12 in connection with an auction-format listing supported by an auction application 32. A feedback table 812 is utilized by one or more reputation applications 50, in one example embodiment, to construct and maintain reputation information concerning users. A history table 814 maintains a history of transactions to which a user has been a party. One or more attributes tables 816 record attribute information pertaining to items for which records exist within the items table 804. Considering only a single example of such an attribute, the attributes tables 816 may indicate a currency attribute associated with a particular item, with the currency attribute identifying the currency of a price for the relevant item as specified by a seller.

Thus, a method and system to provide coordinated shopping among multiple participants in a network-based marketplace have been described. Although the present method and system have been described with reference to specific example embodiments, it will be evident that various modifications and changes may be made to these embodiments without departing from the broader spirit and scope of the application. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method performed at a network marketplace system, the method comprising:
    defining, by one or more processors, a shopping group comprising a first device of a first user that is authorized to make payments and a second device of a second user that is not authorized to make payments in the network marketplace system, the network marketplace system being separate from a payment service;
    determining a network availability status of the first device and the second device;
    receiving a purchase request message from the second device, the purchase request message comprising a request to purchase an item and a message including text input by the second user;
    generating a multi-media message, the multi-media message comprising a payment authorization component and an image of the item to purchase in the network marketplace system, the image comprising a first resolution;
    determining a network delivery mode of transmission based on a network bandwidth limitation of the first device and the network availability status of the first device and the second device;
    modifying the image of the item from the first resolution to a second resolution based on the network bandwidth limitation of the first device;
    transmitting the multi-media message and the purchase request message via the network marketplace system to the first device using the determined network delivery mode of transmission;
    receiving, from the first device via the network marketplace system, a payment authorization decision authorizing payment for the item based on the multi-media message;
    causing the image of the item comprising the second resolution to be displayed on a display of the first device; and
    executing a purchase transaction on the item based on the payment authorization decision.

2. The method of claim 1, wherein the defining of the shopping group is based on input received from the first device that identifies the second user.

3. The method of claim 1, wherein the first user is at least one of a parent, a child, a spouse, a friend, a colleague, a supervisor, or a contractor, and the second user is at least one of a parent, a child, a spouse, a friend, a colleague, a worker, or a subcontractor.

4. The method of claim 1, wherein the multi-media message comprises a description of the item and related purchase information, and the payment authorization decision comprises at least one of an approval, a denial, a request for further information, or item checkout details including a specified vendor and a shipping address.

5. The method of claim 1, wherein the network marketplace system relays the message, and at least one of a notification in the network marketplace system or a text message relays the payment authorization decision.

6. The method of claim 1, wherein the network marketplace system contacts the first user using a communication mode that is based on a current availability status of the first user.

7. The method of claim 6, wherein the current availability status of the first user is determined from at least one of a shared social calendar or a current network marketplace login status.

8. The method of claim 6, wherein, based on the first user being currently available, the network marketplace system places one of a phone call or a video call to the first user to provide the message to receive the payment authorization decision.

9. The method of claim 1, wherein the first user provides the payment authorization decision in video form.

10. The method of claim 1, wherein the network marketplace system contacts the first user and formats transmitted content based on a current bandwidth availability of the first user.

11. A non-transitory computer-readable storage medium having embedded therein a set of instructions which, when executed by one or more processors of a computer, causes the computer to perform operations at a network marketplace system, the operations comprising:
    defining a shopping group comprising a first device of a first user that is authorized to make payments and a second device of a second user that is not authorized to make payments in the network marketplace system, the network marketplace system being separate from a payment service;
    determining a network availability status of the first device and the second device;
    receiving a purchase request message from the second device, the purchase request message comprising a request to purchase an item and a message including text input by the second user;
    generating a multi-media message, the multi-media message comprising a payment authorization component and an image of the item to purchase in the network marketplace system, the image comprising a first resolution;
    determining a network delivery mode of transmission based on a network bandwidth limitation of the first device and the network availability status of the first device and the second device;
    modifying the image of the item from the first resolution to a second resolution based on the network bandwidth limitation of the first device;
    transmitting the multi-media message and the purchase request message via the network marketplace system to the first device using the determined network delivery mode of transmission;
    receiving, from the first device via the network marketplace system, a payment authorization decision authorizing payment for the item based on the multi-media message;
    causing the image of the item comprising the second resolution to be displayed on a display of the first device; and executing a purchase transaction on the item based on the payment authorization decision.

12. The medium of claim 11, wherein the defining of the shopping group is based on input received from the first device that identifies the second user.

13. The medium of claim 11, wherein the first user is at least one of a parent, a child, a spouse, a friend, a colleague, a supervisor, or a contractor, and the second user is at least one of a parent, a child, a spouse, a friend, a colleague, a worker, or a subcontractor.

14. The medium of claim 11, wherein the multi-media message comprises a description of the item and related purchase information, and the payment authorization decision comprises at least one of an approval, a denial, a request for further information, or item checkout details including a specified vendor and a shipping address.

15. The medium of claim 11, wherein the network marketplace system relays the message, and at least one of a notification in the network marketplace system or a text message relays the payment authorization decision.

16. The medium of claim 11, wherein the network marketplace system contacts the first user using a communication mode that is based on a current availability status of the first user.

17. The medium of claim 16, wherein the current availability status of the first user is determined from at least one of a shared social calendar or a current network marketplace login status.

18. The medium of claim 16, wherein, based on the first user being currently available, the network marketplace system places one of a phone call or a video call to the first user to provide the message to receive the payment authorization decision.

19. The medium of claim 11, wherein the first user provides the payment authorization decision in video form.

20. A system comprising:
one or more processors; and
memory including instructions that, when executed by the one or more processors, cause the system to perform operations at a network marketplace system, the operations comprising:
defining a shopping group comprising a first device of a first user that is authorized to make payments and a second device of a second user that is not authorized to make payments in the network marketplace system, the network marketplace system being separate from a payment service;
determining a network availability status of the first device and the second device;
receiving a purchase request message from the second device, the purchase request message comprising a request to purchase an item and a message including text input by the second user;
generating a multi-media message, the multi-media message comprising a payment authorization component and an image of the item to purchase in the network marketplace system, the image comprising a first resolution;
determining a network delivery mode of transmission based on the network bandwidth limitation of the first device and the network availability status of the first device and the second device;
modifying the image of the item from the first resolution to a second resolution based on the network bandwidth limitation of the first device;
transmitting the multi-media message and the purchase request message via the network marketplace system to the first device using the determined network delivery mode of transmission;
receiving, from the first device via the network marketplace system, a payment authorization decision authorizing payment for the item based on the multi-media message;
causing the image of the item comprising the second resolution to be displayed on a display of the first device; and
executing a purchase transaction on the item based on the payment authorization decision.

* * * * *